US011313938B2

(12) United States Patent
Hui et al.

(10) Patent No.: US 11,313,938 B2
(45) Date of Patent: *Apr. 26, 2022

(54) INTELLIGENT DATA COLLECTION AND TRANSMISSION BASED ON REMOTE MOTION SENSING

(71) Applicant: BITwave Pte Ltd., Singapore (SG)

(72) Inventors: Siew Kok Hui, Singapore (SG); Chu Guangzhi, Singapore (SG)

(73) Assignee: BITWAVE PTE LTD., Singapore (SG)

( * ) Notice: Subject to any disclaimer, the term of this patent is extended or adjusted under 35 U.S.C. 154(b) by 60 days.

This patent is subject to a terminal disclaimer.

(21) Appl. No.: 16/713,136

(22) Filed: Dec. 13, 2019

(65) Prior Publication Data

US 2020/0116814 A1 Apr. 16, 2020

Related U.S. Application Data

(60) Division of application No. 15/637,119, filed on Jun. 29, 2017, now Pat. No. 10,539,646, which is a (Continued)

(51) Int. Cl.
*G01S 5/00* (2006.01)
*F42B 12/36* (2006.01)
(Continued)

(52) U.S. Cl.
CPC .......... *G01S 5/0018* (2013.01); *F42B 12/365* (2013.01); *G01S 5/0027* (2013.01);
(Continued)

(58) Field of Classification Search
CPC .............................. G01S 5/0027; G01S 5/0018
See application file for complete search history.

(56) References Cited

U.S. PATENT DOCUMENTS 5,339,281 A * 8/1994 Narendra ................ G01S 3/801
340/566
5,524,169 A 6/1996 Cohen et al.
(Continued)

FOREIGN PATENT DOCUMENTS

CN 2347217 Y 11/1999
CN 1524744 A 9/2004
(Continued)

OTHER PUBLICATIONS

Fortmann et al. ("Sonar tracking of multiple targets using joint probabilistic data association," IEEE Journal of Oceanic Engineering, vol. 8, No. 3, pp. 173-184, Jul. 1983) (Year: 1983).*
(Continued)

*Primary Examiner* — John E Breene
*Assistant Examiner* — Jeffrey C Morgan
(74) *Attorney, Agent, or Firm* — Amin, Turocy & Watson, LLP

(57) ABSTRACT

Remote monitoring of an area with a remote sensing device (100, 200, 300) encased in a rubber ball (302) is provided. A remote sensing device (100, 200, 300) is provided which receives a spoken description of a location of the remote sensing device and stores the spoken description as predetermined location information. The description can be received directly prior to deployment or wirelessly transmitted from another device (400). The remote sensing device can sense information related to its environment via a motion sensor (314), such as whether an intruder is located within a vicinity of the remote sensing device (100, 200, 300). The remote sensing device (100, 200, 300) can then transmit the predetermined location information and the environment information to the another device (400) in response to the sensing. In response to receipt, the other device (400) can render the predetermined location infor-
(Continued)

mation and the environment information in an audible format.

20 Claims, 10 Drawing Sheets

Related U.S. Application Data continuation of application No. 13/697,784, filed as application No. PCT/US2011/035508 on May 6, 2011, now Pat. No. 9,726,747.

(60) Provisional application No. 61/332,531, filed on May 7, 2010.

(51) Int. Cl.
*G01S 5/02* (2010.01)
*G01S 7/02* (2006.01)
*G06F 17/00* (2019.01)

(52) U.S. Cl.
CPC ............... *G01S 5/02* (2013.01); *G01S 7/021* (2013.01); *G06F 17/00* (2013.01)

(56) References Cited

U.S. PATENT DOCUMENTS

| | | | |
|---|---|---|---|
| 6,370,084 | B1 | 4/2002 | Cray |
| 6,914,854 | B1* | 7/2005 | Heberley ............... G01S 3/8006 367/119 |
| 8,009,515 | B2* | 8/2011 | Cecala ..................... G01S 5/20 367/124 |
| 2004/0100868 | A1* | 5/2004 | Patterson, Jr. ........ G01R 31/085 367/127 |
| 2005/0090267 | A1 | 4/2005 | Kotzin |
| 2006/0161339 | A1 | 7/2006 | Holmes et al. |
| 2007/0030156 | A1 | 2/2007 | Schlager et al. |
| 2007/0040062 | A1* | 2/2007 | Lau ........................ F41G 3/147 244/3.16 |
| 2007/0171042 | A1* | 7/2007 | Metes .................... G08B 31/00 340/521 |
| 2007/0266395 | A1 | 11/2007 | Lee et al. |
| 2008/0016440 | A1 | 1/2008 | Liu et al. |
| 2008/0165617 | A1* | 7/2008 | Abbot ................... G01S 15/876 367/3 |
| 2009/0292495 | A1 | 11/2009 | Navarro, Jr. et al. |
| 2017/0025000 | A1* | 1/2017 | Lagassey ............... G08G 1/205 |

FOREIGN PATENT DOCUMENTS

| | | |
|---|---|---|
| CN | 1831557 A | 9/2006 |
| CN | 101014097 A | 8/2007 |
| CN | 201298284 Y | 8/2009 |
| CN | 101585352 A | 11/2009 |
| CN | 101640789 A | 2/2010 |
| WO | WO2010095077 * | 8/2010 |

OTHER PUBLICATIONS

Office Action received for Chinese Patent Application Serial No. 201510427981.2, 5 dated Oct. 16, 2017, 13 Pages.
International Search Report and Written Opinion received for PCT Application Serial No. PCT/US2011/035508 dated Sep. 21, 2011, 15 pages.
Office Action received for Chinese Patent Application Serial No. 201180033718.5 dated Mar. 4, 2014, 19 Pages.
Office Action received for European Patent Application Serial No. 11778413.2 dated May 27, 2014, 1 Page.
Extended European Search Report received for European Patent Application Serial No. 11778413.2 dated May 8, 2014, 6 pages.
Office Action received for Chinese Patent Application Serial No. 201180033718.5 dated Nov. 3, 2014, 12 Pages.
Non-Final Office Action received for U.S. Appl. No. 13/697,784 dated Feb. 11, 2016, 32 pages.
Final Office Action received for U.S. Appl. No. 13/697,784 dated Aug. 26, 2016, 20 pages.
Office Action received for Chinese Patent Application Serial No. 201510427981.2, 5 dated Apr. 6, 2017, 16 Pages.
Non-Final Office Action received for U.S. Appl. No. 13/697,784 dated Dec. 19, 2016, 13 pages.
Office Action received for Chinese Patent Application Serial No. 201510427981.2, 5 dated Jul. 18, 2018, 8 Pages.
Office Action received for European Patent Application Serial No. 11778413.2 dated Jan. 29, 2018, 5 Pages.
Office Action received for Chinese Patent Application Serial No. 201510427981.2, 5 dated Feb. 24, 2018, 9 Pages.
Invitation pursuant to Article 94(3) and Rule 71 (1) EPC received for European Patent Application Serial No. 11778413.2 dated Jun. 26, 2017, 6 Pages.
Non-Final Office Action received for U.S. Appl. No. 15/637,119 dated Jan. 18, 2019, 37 pages.

* cited by examiner

INTELLIGENT DATA COLLECTION AND TRANSMISSION BASED ON REMOTE MOTION SENSING

RELATED APPLICATION

This patent application is a divisional of, and claims priority to each of, U.S. patent application Ser. No. 15/637,119 (now U.S. Pat. No. 10,539,646), filed Jun. 29, 2017, and entitled "INTELLIGENT DATA COLLECTION AND TRANSMISSION BASED ON REMOTE MOTION SENSING," which is a continuation of U.S. patent application Ser. No. 13/697,784 (now U.S. Pat. No. 9,726,747), filed Feb. 27, 2013, and entitled "INTELLIGENT DATA COLLECTION AND TRANSMISSION BASED ON REMOTE MOTION SENSING," which is a U.S. National Stage of PCT Application No. PCT/US11/35508, entitled "INTELLIGENT DATA COLLECTION AND TRANSMISSION BASED ON REMOTE MOTION SENSING" filed May 6, 2011. Each of the foregoing applications claim priority to U.S. Provisional Patent Appln. No. 61/332,531, entitled "System and Apparatus of an Intelligent Rubber Ball Acoustic Sensor," filed May 7, 2010, and the entireties of the foregoing applications are hereby incorporated by reference herein.

TECHNICAL FIELD

This disclosure relates generally to motion sensing, in particular to remote motion sensing and wireless transmission of location and environment information related to the remote motion sensing.

BACKGROUND

Acoustic sensing devices can be used in a variety of environments to allow monitoring of a location through acoustic signal acquisition. Conventional acoustic sensing devices are activated by an individual manually and the placed in a particular location desired to be monitored. The location of the sensing device can be pre-programmed into the device before it is deployed. If the sensing device is to be deployed remotely such as in field, the sensing device can be equipped with a global positioning system (GPS) to enable locating the device after deployment.

However, the task of pre-programming each and every sensing device prior to deployment can be cumbersome and time consuming. For example, in urban area or built up area, a tall hotel may have thousands of rooms or an underground station with many outlets and corridors stretching for a few kilometers. Such a hotel or underground station can require hundreds or even thousands of monitoring devices to adequately cover the area. The task of pre-programming each and every sensing device and sequencing their deployment can become an almost impossible task in this scenario. Further, in indoor areas like the ones mentioned above, GPS is not operational or feasible.

The above-described deficiencies of conventional acoustic sensing devices are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above noted deficiencies and other drawbacks of current ground sensing devices, a wireless acoustic sensor network is provided. The network comprises one or more remote sensor devices employing acoustic sensors which may be supplemented with magnetic and seismic motion sensors. The remote sensing devices can be encased in a lightweight protective housing such as a rubber ball. By providing the device in a rubber ball, such as a tennis ball, the device is made is lightweight and exhibits low power consumption. In addition, by providing the device in a rubber ball, it can be deployed by many means. For instance, the ball can be put in place by a person or machine in one of the following ways: (1) launched from a launcher to an intended location; (2) thrown to a location; (3) placed onto a location; or (4) dropped from air to a location. In order to program the remote sensing device, the device can receive audio input.

The remote sensing devices are further coupled to a remote network hub, such as another device serving as a management and/or monitoring device via a wireless communication network. The management device can further be coupled to one or more other external devices such as a user device. The remote sensing devices are configured to perform acoustic scene analysis and are equipped with acoustic signal acquisition, interference sound cancellation, noise cancellation and acoustic sources localization and classification capabilities. The remote sensing devices can further transmit any information gathered or collected related to its environment to another device in order to alert the other device of its environment. In addition to transmitting environment information, the remote sensing device can transmit predetermined location information. As such, a receiving device can easily become informed of activity occurring at a specific remote location.

In an embodiment, a device is provided a housing encasing components, including: an input component configured to receive predetermined location information, a data store configured to store the predetermined location information, a sensor component comprising at least one sensor and configured to receive environment information related to an environment of the device, and a communication component configured to wirelessly transmit the predetermined location information and the environment information. In an aspect, the housing is a rubber ball. Further, the input component can be configured to receive the predetermined location information as voice data and wherein the data store is configured to store the predetermined location information in a format for speech playback.

In another aspect, a device is provided comprising a processor configured to execute the following computer executable components retained in memory: a programming component configured to program a remote sensing device with predetermined location information; and a monitoring component configured to receive the predetermined location information and environment information of the remote sensing device.

In addition, a method is disclosed comprising receiving predetermined location information by a remote sensing device, storing the predetermined location information, sensing information related to an environment of the remote sensing device, and transmitting the predetermined location information and the environment information. In an aspect, the receiving the predetermined location information comprises receiving a spoken description of the predetermined location information, and wherein the storing the predetermined location information comprises storing the predetermined location information in an audio format for speech playback of the predetermined location information.

Further, a method is provided comprising programming a remote sensing device with predetermined location information, wherein the remote sensing device is encased in a rubber ball; and receiving the predetermined location information and environment information of the remote sensing device in real-time when the remote sensing device receives the environment information. In an aspect, the programming includes inputting audible predetermined location information and wherein the receiving includes receiving the predetermined location information in the audible format.

Furthermore, provided is a computer readable storage medium comprising computer executable instructions that, in response to execution, cause a remote sensing device encased in a rubber ball to perform operations comprising: receiving predetermined location information by the remote sensing device encased in the rubber ball, sensing environment information meeting a predetermined criterion related to an environment of the remote sensing device, and in response to the sensing the environment information that meets the predetermined criterion, transmitting the predetermined location information and the environment information.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
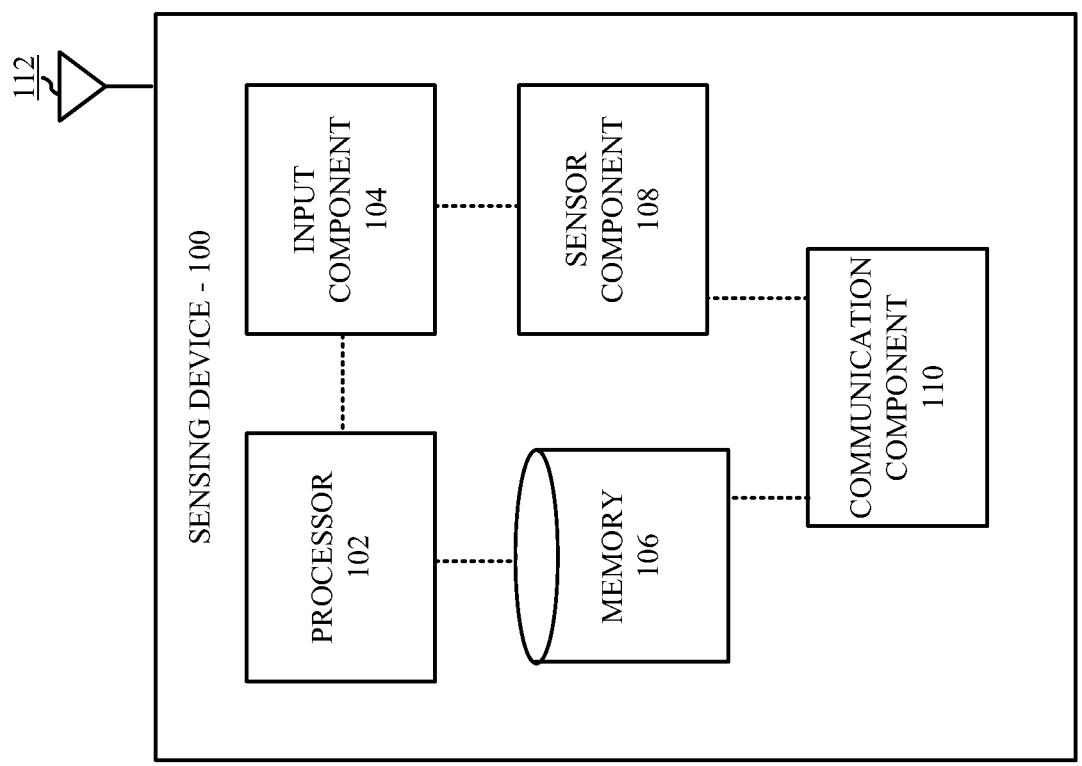
FIG. 1 illustrates a block diagram of a remote sensing device in accordance with an embodiment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Referring now to FIG. 1, illustrated is sensing device 100, in accordance with an embodiment. Aspects of sensing device 100, and systems, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

As seen in FIG. 1, sensing device 100 comprises a processor 102, an input component 104, a memory, 106, a sensor component 108, a communication component 110, and an antenna. The processor 102 facilitates controlling and processing all onboard operations and functions of the sensing device 100. Memory 106 interfaces to the processor 102 for storage of data and one or more applications of the sensing device 100. The applications can be stored in the memory 106 and/or in a firmware, and executed by the processor 102 from either or both the memory 106 or/and the firmware (not shown). The firmware (not shown) can also store startup code for execution in initializing the handset sensing device.

Input component 104 facilitates receipt of information for the sensing device 100 which can then be stored in memory 106. In an aspect, input component 104 facilitates receipt of operational instructions for the sensing device 100. In another aspect, input component 104 facilitates receipt of descriptive information. For example, the input component 104 can facilitate receipt of predetermined location information. Pre-determined location information includes information relating to a location of the device known prior to deployment of the device at the location. Thus predetermined location information includes information related to the location of a device that is not collected or learned by the device itself. For instance, pre-determined location information is information that is not collected by the device itself by a global positioning system (GPS). Accordingly, pre-determined location information can include information sent to the device external from the sensing device 100.

According to an embodiment, the input component 104 can include a microphone for receiving audible information. The audible information can then be recorded into memory 100 and stored for later transmission or playback. For example, an individual can verbally recite information which can be captured by the device through the input component 104. The spoken instructions can then be recorded into memory 100. According to an embodiment, the input spoken instructions include predetermined location information. It should be appreciated that any information can be recorded into the device through the input component 104 for later playback and transmission. For example, an individual can record information such as the date and/or time of deployment, the team working in the area of deployment, or an identification number or tag for the device 100.

In an aspect, the information can be captured in an audible form and saved in a format that allows for audible rendering. In another aspect, the input component 104 can employ a text to speech conversion mechanism. For example, the input component 104 can employ the processor 102 and execute software supporting text to speech conversion stored in memory. According to this aspect, the input component 104 can receive spoken instructions and convert the spoken instructions to a text format. The converted instructions can then be stored in memory 106 for later transmission in a text format.

Sensor component 108 can include one or more sensors that facilitate capturing information regarding the environment of the device 100. Once the information is captured, it can be stored in memory 106 and/or transmitted to another device. Prior to storing and or sending, any signals captured by the sensor component can be digitized. In an aspect, sensor component 108 include one or more motion sensors. The motion sensors can generate information indicating that an object such as a human or vehicle is within a sensing range of the motion sensor. By way of example, a motion sensor could have a predefined sensing radius of four meters. Thus, when a motion sensor is triggered, in an aspect, the environment information can include notice, for example, that an object was within four meters of the device 100.

A variety of motion sensors having a wide range of sensing radiuses are within the scope of the subject disclosure. For example, the sensor component 108 can include acoustic sensors for detecting motions by sound. In another aspect, motion can be detected by opacity through optical and infrared sensors and video image processors. Motion can also be detected by geomagnetism through magnetic sensors or magnetometers, by reflection of transmitted energy through infrared laser radar, ultrasonic sensors, and microwave radar sensors, by electromagnetic induction through inductive-loop detectors, and/or vibration through triboelectric, seismic, and inertia-switch sensors. In an embodiment, once motion is detected by the sensor component 108, the device 100 can transmit a notification of motion detection to another device (described infra), further process and analyze the motion signal (described infra), and/or save data related to the motion detection in memory 106.

In another aspect, the sensor component 108 can comprise a microphone. It should be appreciated that a single microphone can function as both the input component, and the sensor component 108. According to this aspect, in addition to detecting noise through the microphone, the noise can be captured and transmitted to another device in real-time. According to this aspect, an individual at a remote location can listen to audio captured by the device 100.

In addition to motion detection type sensors, sensor component 108 can employ a variety of sensors that facilitate determining environment information related to a current position/location of the device 100. In order to detect a current location of the device 100, sensor component can employ a global positioning system (GPS), a three dimensional digital compass, a gyro, and/or an accelerometer. According to this embodiment, in addition to the predetermined location information stored in memory 106, device 100 can employ the sensor component in order to further obtain accurate location information. For example, although in certain instances, the device 100 can be placed at a precise location, in other instances, the device 100 can be launched into location by a launcher, thrown into location, or dropped into location from an airplane or helicopter. Accordingly, circumstances can arise where the general location of the device is known beforehand but the precise location where the device will settle is not. In addition, circumstances can arise where the device 100 is moved after placement or setting. Therefore, by including at least one of a global positioning system (GPS), a three dimensional digital compass, a gyro, or an accelerometer, the device can gather or collect information regarding its current location. Further, by employing a three-dimensional digital compass, sensor component 108 can collect environment information regarding the position/location of an object sensed via a motion sensor.

Turning back to FIG. 1, device 100 can further include a communication component 110. Communication component 110 is configured to facilitate communication of information between the device 100 and another device. In an aspect, device 100 can communicate with other deployed sensing devices, other remote devices, and/or a management device, by employing a variety of telecommunication schemes and protocols. Device, 100 employs the communication component 110 to send at least environmental information to another device. For example, once device 100 captures environment via the sensor component 108, it can then send the environment information to another device such as a managing device or a base station. In an aspect, communication component 110 is configured to automatically send information in response to the sensor component capturing environment information. In another aspect, communication component 110 can be configured to send information according to predetermined criteria. For example, the communication component 110 can be configured to send information when two, five or ten objects have been sensed, or when objects are sensed on a certain day or time of day. Instruction regarding when communication component should send information can be stored in memory 106. In addition, as noted above, environment information can be stored in memory 106 once received. In another aspect, another device such as a base station, can request stored information. According to this aspect, communication component 110 can facilitate sending of information in response to a request. Along with the environment information, the device 100 can further send the predetermined location information and/or identification information. As discussed infra, another device or managing station can receive the environment information and location information.

Communication component 110 interfaces to the processor 102 to facilitate wireless communication with external systems, e.g., cellular networks, voice over internet protocol (VoIP) networks, and so on. The communication component 100 is operable to communicate with any wireless devices or entities operatively disposed in wireless communication, e.g., a printer, a facsimile, a desktop or portable computer, portable data assistant, communications satellite, any piece of equipment or location associated with a wirelessly detectable tag (e.g., a kiosk, news stand, restroom), and telephone. This includes at least Wireless Fidelity (WiFi) and Bluetooth™ wireless technologies. Thus, the communication component can communicate with a predefined structure as with a conventional network or employ an ad hoc communication between at least two devices.

The communication component 110 can also include a suitable cellular transceiver (e.g., a Groupe Spécial Mobile (GSM) transceiver) and an unlicensed transceiver (e.g., WiFi, WiMax, etc.) for corresponding signal communications. The communications component 110 also facilitates communication transmission to and from terrestrial radio networks (e.g., broadcast), digital satellite radio networks, and Internet-based radio services networks. Device 100 further includes an antenna 112, to facilitate sending and receiving transmissions.

Device 100 can be used in a variety of environments. Certain features of device 100 can be realized via the following example wherein device 100 is used in a military context. According to this example, the device 100 can be used in a military environment wherein device 100 is employed within a building. Prior to deployment, a soldier or authorized personnel can speak location information into the device and cause the spoken location information to be stored within the device. The soldier can then place the device within the building at the location specified by the stored location information. The device 100 can be equipped with an acoustic sensor. When the acoustic sensor senses an object, it can then transmit a signal to another device such as a base station. The signal can include information indicating an "intruder" has been recognized a location XYZ within the building. When received at the base station, the information can be rendered in an audible format or a textual format. In addition, the base station can receive all audible information received by the sensor of the device 100 in real-time. Thus a user at the base station can listen to the activity occurring around the device 100 in real-time.

Figure 2:
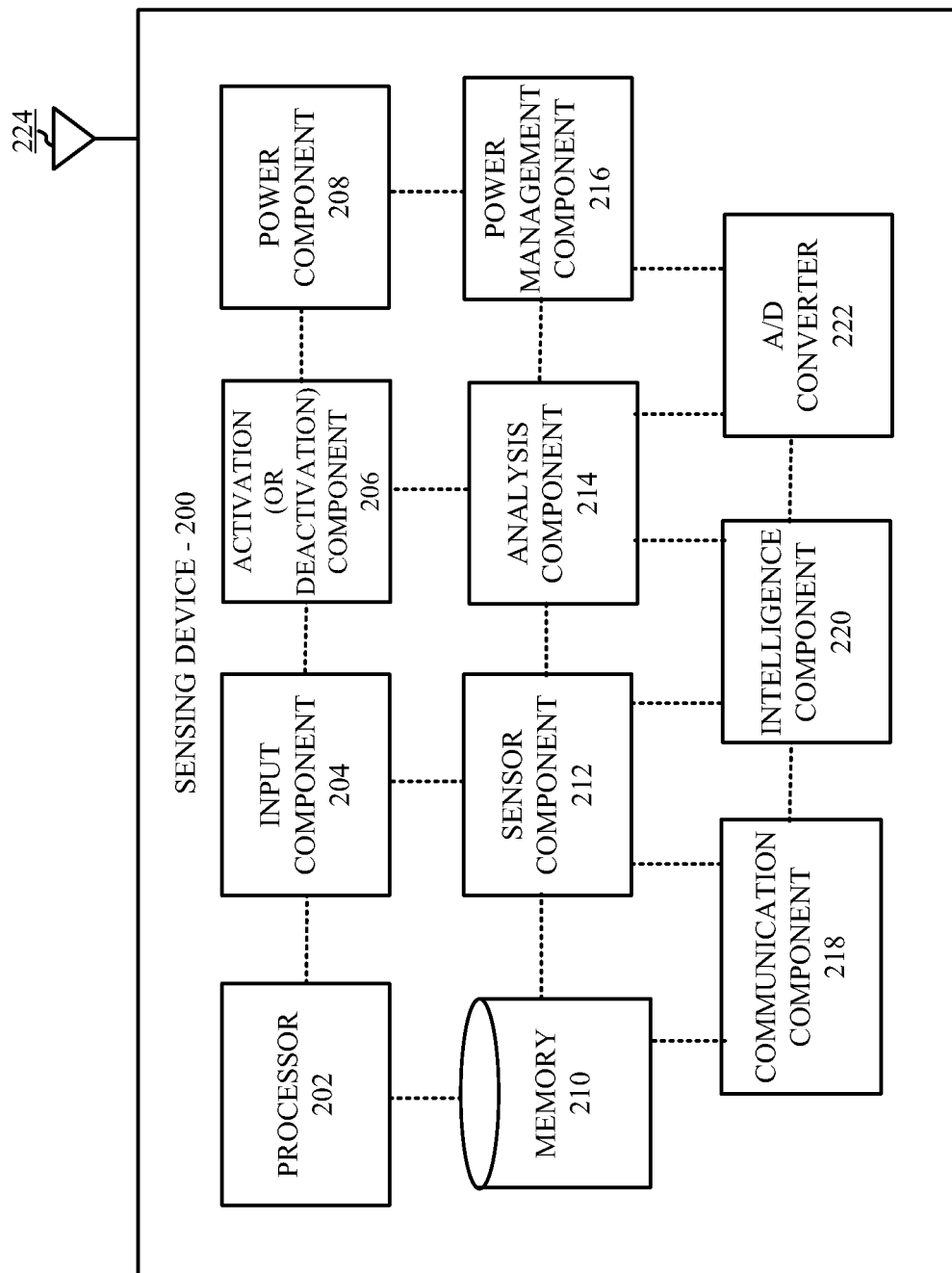
FIG. 2 illustrates a block diagram of remote sensing device in accordance with another embodiment.

Referring now to FIG. 2, depicted is another embodiment of a sensing device 200 in accordance with the subject disclosure. Sensing device includes all of the components of sensing device 100 including a processor 202, an input component 204, a memory 210, a sensor component 212, a communication component 218, and an antenna 224. It is noted that each of the components shared by devices 100 and 200 can function in an identical manner. In addition, device 200 further includes activation component 206, analysis component 214, intelligence component 220, power component 208, power management component 216, and A/D converter 222.

Activation component 206 is configured to activate at least the sensing activity of the sensor component. In another aspect, activation component is component is configured to turn on and off device 200. A variety of mechanisms can be employed in order to activate device 200. In one embodiment, activation component 206 activates device 200 in response to receiving spoken location information. According to another aspect, activation component 206 can receive voice recognition commands. For example, activation component 206 can activate device 200 in response to hearing the words "Activate" or "Turn on." Still, in yet another aspect activation component 206 can be configured to active or deactivate the sensor component in response to receipt of an activation or deactivation command respectively, from a remote device, (discussed infra). Further, activation component 206 can facilitate activation via manually manipulating the device 200. For example, device 200 can be activated in response to the turning of a button, in response to squeezing the device, or in response to hitting the ground after being thrown or dropped. Once, device 200 is activated, it can send a notification of activation to another device such as a base station or monitoring device.

In addition to activating the device 200, activation component can facilitate deactivating of device 200. In one aspect, activation component 200 can be configured to deactivate the device in response to receipt of a command line script from a remote device. In another aspect, activation component can be configured to deactivate device 200 in response to a predetermined condition. For example, activation component 200 can be configured to deactivate device 200 when it identifies that the device has been moved. According to this aspect, the sensor component 212 comprises at least one of a GPS, a three dimensional digital compass, a gyro or an accelerometer to provide information related to a current location of the device 200. If the device 200 is moved from its programmed location, the sensor component will supply the activation component 212 with the new location information. If the new location information differs from the predetermined location information to a pre-determined degree, such as over 10%, then the activation component can automatically deactivate device 200. In an aspect, when the activation component deactivates device 200, device 200 can send an error or deactivation message to another device such as a base station.

According to another embodiment, device 200 can include an analysis component 214. As discussed above, sensor component 108, and similarly sensor component 212, facilitates receipt of environment information for the device 200. Environment information can include any information gathered or collected by the sensor component which relates to the environment of the device. For example, environment information can include a signal representing activation of a motion sensor by an object. In addition, environment information can include information relating to a current location of device 200 as gathered via a GPS, three dimensional digital compass, gyro or accelerometer. In addition, environment information can include information related to the location of an object around the device 200 determined via a three-dimensional sensor.

Analysis component 214 is configured to employ raw environmental information gathered by the sensor component to further build context data, or better picture regarding details of the environment around the device. In order for the analysis component to process information received at the sensor component, device 200 can be provided with an analog to digital A/D converter 222 to digitize a signal. Analysis component 214 then employs processor 202 to perform digital signal processing. In an aspect, the analysis component 214 is configured to employ one or more algorithms to the received environmental information to further determine a type of object sensed by the sensing device 200, a number of objects sensed by the sensing device 200, a direction of movement of an object sensed by the sensing device 200, or a location of an object sensed by the sensing device 200. For example, in an aspect the analysis component can determine whether an animal, a human, or a machine is located around the remote sensing device. In another example, using the information from multiple motion sensors located around the device and the three dimensional digital compass, the analysis component can employ an algorithm that can compute the estimated Direction of Arrival (DOA) of an intruder with respect to the device 200 and even map it out on the floor plan or map. In addition the analysis component can further be configured to receive signals from sensor component and perform interference sound cancellation, noise cancellation and acoustic sources localization and classification, in order to further dissect a signal to determine the context of a sensing device 200. Once processed, the context data can be stored in memory 210 or transmitted via communication component 218.

In addition, device 200 can include an intelligence component 220 to make an inference regarding the context information based on a comparison between previously received environment information, previously determined context information, and current environment information. Inference component 200 employs explicitly and/or implicitly trained classifiers in connection with performing inference and/or probabilistic determinations and/or statistical-based determinations as in accordance with one or more aspects of the disclosed subject matter as described herein. For example, the inference component 220 can employ stored environment information and stored context information and automatically make a determination of the likely context of a device with respect to newly received environment information based on learned scenarios given the stored environment and context information.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Device, 200 further includes power component 208, power management component 216. Power component 208 can include any power source capable of supplying power to device 200. In an aspect, the power component 216 includes a battery. The battery can be rechargeable. In another aspect, the power component can include an induction coil operable with an induction system. Further, power management component 216 can facilitate managing the power of device 200. In an aspect, power management component can regulate the amount of power to be supply to the power component based on predetermined conditions or learned conditions. For example, where device 200 includes a plurality of motion sensors, the power management component can supply power to only a single sensor. Upon detection of motion by the single sensor, the power management component can in turn supply power to all of the plurality of sensors. When the motion stops, the power management component can then return to supplying power to the single sensor. In another aspect, the power management component can be configured to notify another device, such as a base station, when the power of device 200 drops below a certain level.

Figure 3:
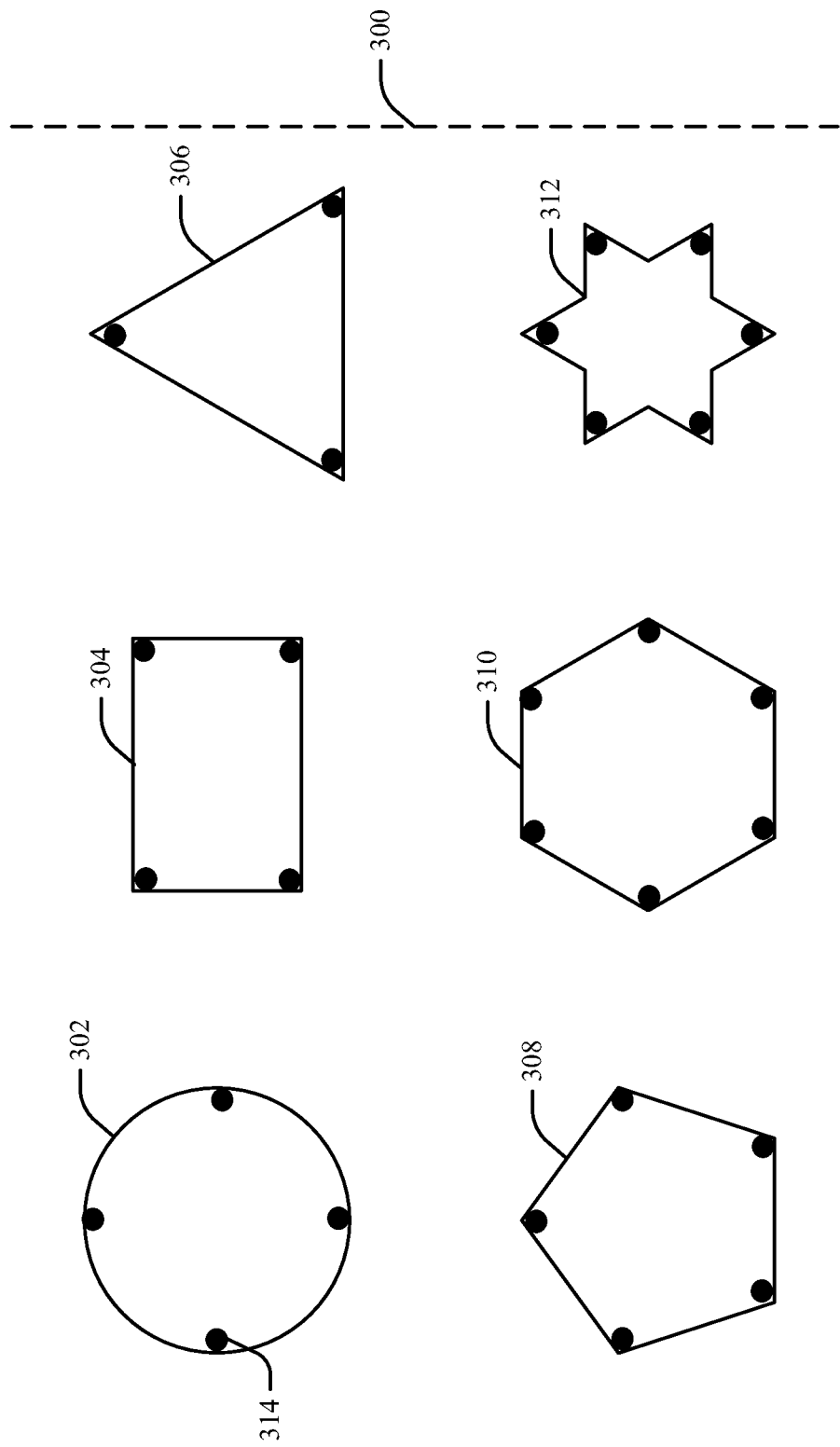
FIG. 3 illustrates one or more aspects of housings or encasing for a remote sensing device.

Referring back to the drawings, FIG. 3 depicts a variety of sensing devices 300 employing encasings in accordance with an aspect of the subject disclosure. Sensing devices 300 can include all or some of the components of sensing devices 100 or 200 although not depicted. FIG. 3 particularly presents various encasings 302-312 for sensing devices 300. In addition, each of the sensing devices 300 is depicted with sensors 314. It should be appreciated that although encasing 302-312 are presented in two dimensions, the encasing 302-312 are three dimensional. Thus encasing 302 is representative of a sphere, encasing 304 a rectangular prism, encasing 304 a triangular prism, and so on. The arrangement of motions sensors creates a micro-vector sensor array. In an aspect the sensors 314 can include only motion sensors and/or only acoustic sensors. In another aspect, the sensors 314 can include a variety of sensors.

Each of the encasings 302-312 comprise of a protective material that shields internal components from environmental factors, such as water, and protects the internal components from damage when the device is dropped or bumped. In an aspect, the protective material is rubber. In another aspect, the protective material is plastic. In another aspect the encasing can hermetically seal the device. It should be appreciated that a variety of protective materials can be employed which facilitate sealing and protecting the device. Preferably, the protective material employed is lightweight. By employing the device in a durable casing the device can be put in place by a person or machine in one of the following ways: (1) launched from a launcher to an intended location; (2) thrown to a location; (3) placed onto a location; or (4) dropped from air to a location. Further, the sensors 314 can be embedded into the encasing. Accordingly the sensors 314 extremely ruggedized and will operate under severe weather conditions.

In one embodiment, the encasing is in the shape of a ball 302. For example, the ball can be a rubber ball such as a tennis ball. In addition, the sensors 314 can be embedded directly into the rubber material constituting the encasing. According to this embodiment the sensors will function irrespective of orientation or position and independent of surroundings or obstructions, e.g., they would continue functioning even if placed under a bed or inside a cabinet. The ball 302 can be made soft enough such that it will not cause serious injury if it hits a civilian during mass deployment. Further the ball 302 can be easily camouflaged amongst other dud balls without sensors embedded. The encasing can further be camouflaged to match it surroundings. For example, the encasing 302 can be made the color of sand or grass.

It should be appreciated that the encasings for the devices can comprise any number of shapes and sizes. Encasings 304-312 present some examples of shapes of encasings although the subject disclosure is not so limited. Given that shapes 304-312 comprise flat surfaces, shapes 304-312 reduce rolling when/if the device is dropped or thrown into place.

Figure 4:
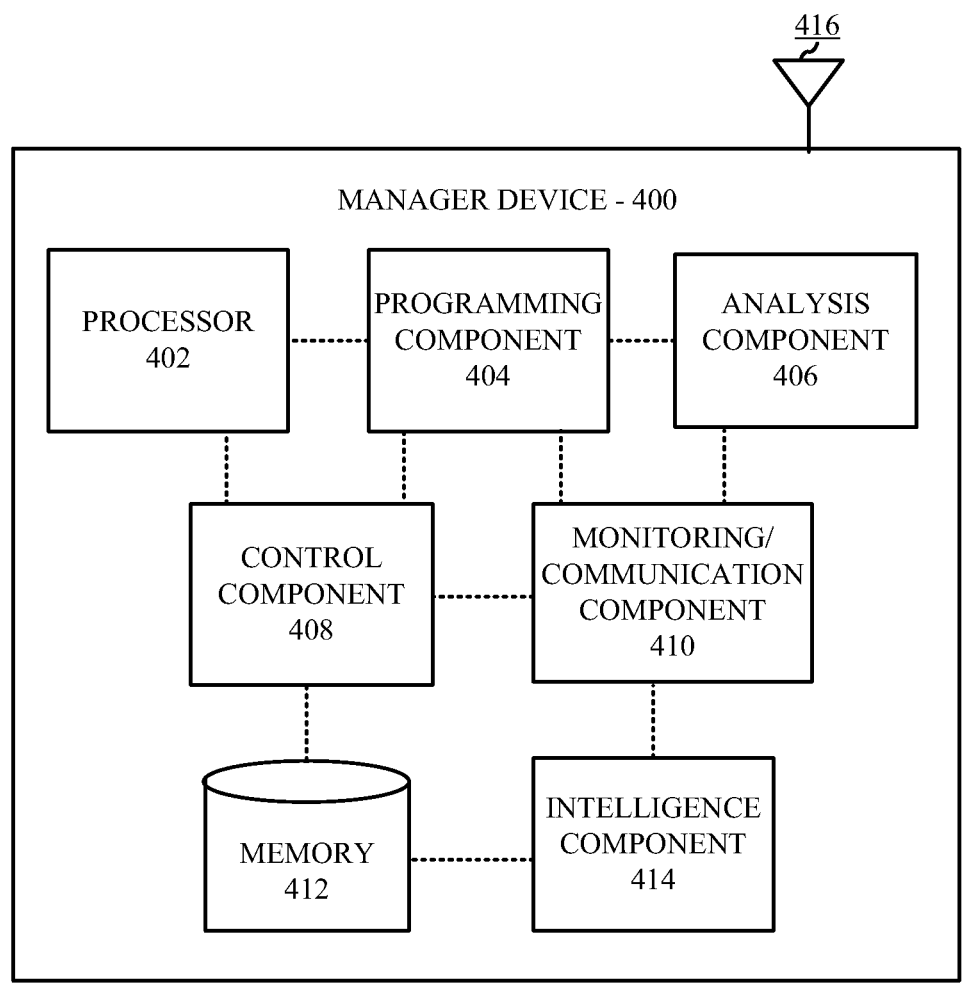
FIG. 4 illustrates a manager device in accordance with an embodiment.

Turning now to FIG. 4, presented is a manger device 400 in accordance with an embodiment of the subject disclosure. Managing device 400 serves as a base station that can manage and control one or more deployed sensing devices in a particular. Although the device 400 is termed "managing device" it should be appreciated that device 400 can serve a variety of roles in accordance with the various functionalities of the components described herein. For example, in an aspect the managing device can serve to program a remote sensing device, control a remote sensing device, and receive broadcasts of environmental and/or context data from the remote sensing device. The managing device can further include a speaker and accommodate real-time streaming of audio data transmitted thereto by a remote sensing device. In another aspect, (discussed infra) the managing device can merely serve as relay device between one or more remote sensing devices and an external server or other device. According to this aspect, managing device 400 can communicate with the remote sensing devices using a first type of communication protocol and further communicate with an external server using another type of communication protocol.

Thus managing device 400 can include any device capable of being configured to communicate with sensing devices 100-300. For example, the managing device can include a fixed computer, a portable computer, a smart phone, a telephone, or personal digital assistant, etc. Managing device 400 includes a processor 402, a memory 412, a programming component 404, an analysis component 406, a control component 408, a monitoring/communication component 410, an intelligent component 414, and an antenna 416. The processor 402 facilitates controlling and processing all onboard operations and functions of the manager device 400. Memory 412 interfaces to the processor 402 for storage of data and one or more applications of the manager device 400. The applications can be stored in the memory 412 and/or in a firmware, and executed by the processor 402 from either or both the memory 412 or/and the firmware (not shown). The firmware (not shown) can also store startup code for execution in initializing the handset sensing device.

The managing device 400 can further include a display such as an LCD screen for displaying text, images, video, telephony functions (e.g., a Caller ID function), setup functions, and for user input. The display can also accommodate the presentation of multimedia content (e.g., music metadata, messages, wallpaper, graphics, . . . ). Managing device 400 can further include audio capabilities such as speaker for the output of audio signals. An audio component can also facilitate the input of audio signals through a microphone to record data and/or telephony voice data, and for inputting voice signals for telephone conversations. The managing device 400 can also include a user input component such conventional input device technologies including a keypad, keyboard, mouse, stylus pen, or touch screen, for example.

In order to facilitate communications, the managing device 400 includes a monitoring/communication component 410. The monitoring/communication 410 component can employ a variety of communication schemes and protocols in order to communicate with a remote sensing device. Communication component 410 interfaces to the processor 402 to facilitate wireless communication with external systems, e.g., cellular networks, VoIP networks, and so on. The communication component 410 is operable to communicate with any wireless devices or entities operatively disposed in wireless communication, e.g., a printer, a facsimile, a desktop or portable computer, portable data assistant, communications satellite, any piece of equipment or location associated with a wirelessly detectable tag (e.g., a kiosk, news stand, restroom), and telephone. This includes at least Wireless Fidelity (WiFi) wireless technologies. In an aspect, the communication/monitoring component 410 can employs short range wireless transmission such as infrared transmission technology or Bluetooth™ technology. Thus, the communication component can communicate with a predefined structure as with a conventional network or employ an ad hoc communication between at least two devices.

The communication/monitoring component 410 can also include a suitable cellular transceiver (e.g., a Groupe Special Mobile (GSM) transceiver) and an unlicensed transceiver (e.g., WiFi, WiMax) for corresponding signal communications. The communications component 410 also facilitates communication transmission to and from terrestrial radio networks (e.g., broadcast), digital satellite radio networks, and Internet-based radio services networks. Managing device 400 further includes an antenna 416, to facilitate sending and receiving transmissions.

In addition to merely facilitating communications, the monitoring/communication component 410 is configured to receive information from a remote sensing device such as devices 100-300. The monitoring/communication component 410 can receive predetermined location information and environment information of the remote sensing device. In another aspect, the monitoring/communication component 410 can receive context information transmitted from a remote sensing device. In one embodiment, the monitoring/communication component 410 receives information each time the remotes sensing device senses and object. In another aspect the monitoring/communication component 410 can request the remote sensing device send information. For example, the monitoring/communication component 410 can be configured to request information regarding the status of the remote sensing device and in response to the request, receive the status information. Status information can includes information such as a location of the remote sensing device, a current environment or context of the remote sensing device, or a power level of the remote sensing device.

Following receipt of information, the monitoring/communication component 410 employs processor 402 to process the information and output the processed information. For example, the monitoring/communication component 410 can facilitate displaying the information and/or playback of the information as audio. According to this example, a mapped display of each remote sensing device can be presented on the managing device. The display can include an icon for each device. A network manager can simply click on an icon for a device to receive information for that device. In another aspect, when a device is activated, its icon can blink or become enlarged, indicating activity at the remote sensing device. In response, the network manager can access the information for a particular remote sensing device by clicking on the icon. In another aspect the monitoring/communication component 410 can facilitate storing the received information for later processing and analysis. In yet another aspect, discussed infra, the monitoring component can 410 can act as a relay to direct receipt of information received by the managing device 400.

Managing device 400 further includes a programming component 404 configured to program a remote sensing device such as devices 100-300 with information, such as location information or identification information. In an aspect, programming component facilitates inputting audible information intro a sensing device a format that allows for audible rendering of the information. In another aspect, managing device 400 can deliver information to a remote sensing device which can in turn be saved in a memory of the remote sensing device. According to this aspect, the managing device can program/configure any remote sensing device from afar, even after deployment. For example, in addition to receiving information via the input component 104 as discussed above, in another aspect, device 100-300 can receive information directly via transmission of information from another device such as the managing device 400. For example, a remote device can include an identification number tag or stored in memory. A remote sensing device 100-300 can transmit a beacon embodying the identification number which can be received by managing device 400. The managing device 400 can then identify the particular remote sensing device via a look up table. When the remote sensing device is identified, the base station can then transmit information to the remote sensing device which the remote sensing device can in turn store in memory. For example, the base station can transmit original predetermined location information or new location information which can replace old location information.

In addition, managing device 400 can include a control component 408. Control component 408 enables managing device 400 to remotely control a sensing device such as devices 100-300 through the transmission of one or more command line scripts. In an aspect, control component is configured to activate and/or deactivate the sensing capabilities of a remote sensing device. In another aspect, control component in can remotely turn on or off a remote sensing device. Still in yet another aspect, the control component 408 can control the function of the power management component 216, of a remote sensing device. According to an embodiment, the managing device can receive environmental information regarding a current location of a remote sensing device. For example, a remote sensing device can be deployed with predetermined location information. If/when the remote sensing device is moved, the remote sensing device can transmit data identifying its new location. The control component can further be configured to identify when a remote sensing device has moved beyond a defined boundary area with respect to its programmed location and automatically turn off or deactivate the remote sensing device.

Further, managing device 400 can include an analysis component 406 and an intelligence component 414. Analysis component 406 and intelligence component 414 can function in a similar manner to analysis component 214 and intelligence component 220 discussed supra with respect to FIG. 2. For example, analysis component 406 can employ environmental data received at the managing device 400 from a remote sensing device. The analysis component 406 can further processes the received raw environmental data to determine the context data of the remote sensing device, such as a type of object sensed, a number of objects sensed, a direction of movement of an object sensed, or a location of an object sensed. The analysis component can further employ environmental data related to a current location of a sensing device embodied in data gathered from a GPS, a three-dimensional sensor, a gyro, and or an accelerometer, and determine the precise current location of a sensing device. The intelligence component 414 can further be employed to make an inference regarding context data based on a comparison between previously received environment information, previously determined context information, and currently received environment information.

Figure 5:
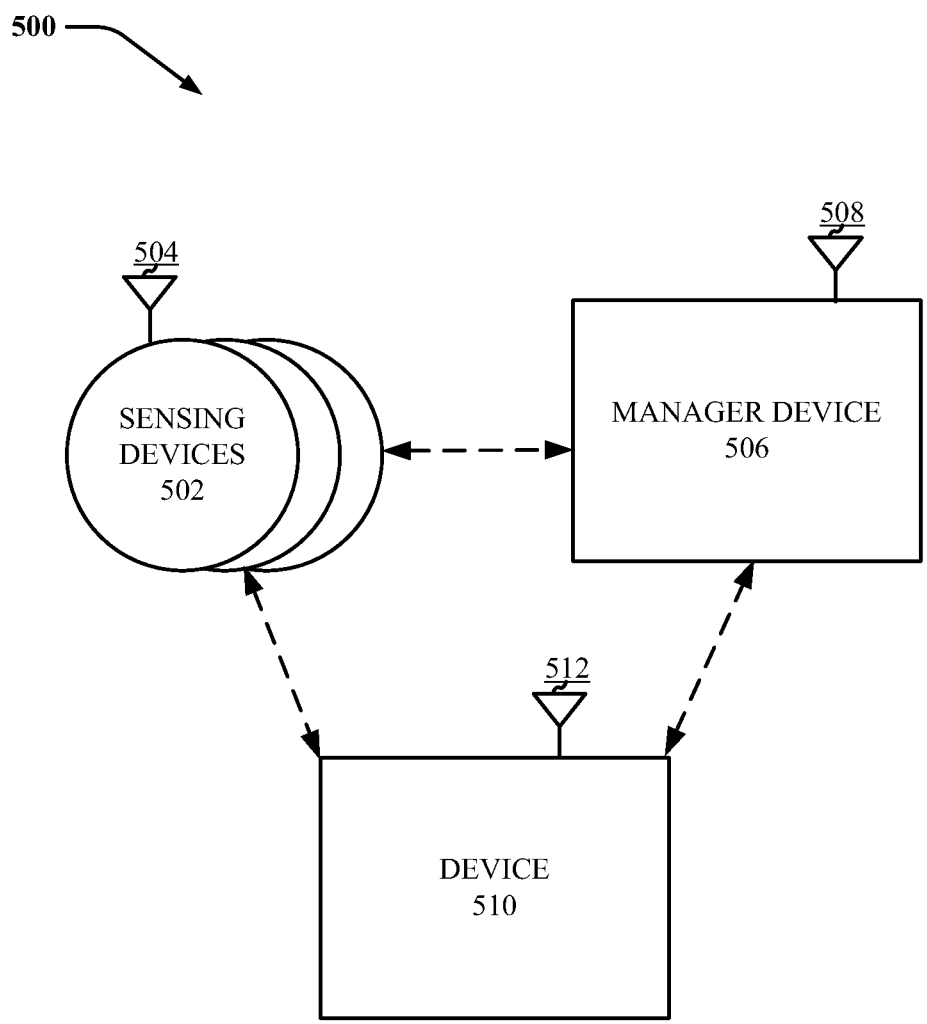
FIG. 5 presents a remote monitoring system in accordance with an embodiment.

Turning now to FIG. 5, depicted is a security monitoring system in accordance with one or more embodiments of the subject disclosure. System 500 employs one or more sensing devices 502 each comprising an antenna 504 for communication with one or both of a manager device 506 or another device. According to the subject system 500, a plurality of sensing devices can be deployed at a remote site, such a combat field. The sensing devices 502 can include any of the sensing devices 100-300 discussed herein. In an aspect, the sensing devices can transmit information directly to either the manager device 506 and/or the other device 510. In another aspect, the sensing devices 502 can communicate with the other 510 though the manager device 506. For example, the manager device can serve as a relay and an access point for the sensing devices to communicate with an external base station or user device. In addition, the manager device 506 and the other device 510 can include one or more of the components of manager device 400 discussed supra.

In an aspect, each of the sensing devices 502 can comprises at least one motion sensor. The sensing devices 502 can receive environmental information and transmit the environmental information to the manager device 506, or the other device 510. The receiving device can in turn perform acoustic scene analysis and process and analyze the environmental data to develop context data associated with a particular sensing device 502. In another aspect, the sensing device can perform the acoustic scene analysis and transmit context data directly to the manager device 506 and/or the other device 510. Communication between the sensing devices 502, the manager device 506, and the other device 510 can be facilitated by any type of wireless communication scheme and protocol. Manager device 506 and other device 510 can each employ an antenna 508 and 512 respectively, in order to facilitate communication.

As noted above, in addition to receiving environmental information directly from the sensing devices 502 at the other device 510, managing device 506 can act as a relay to direct receipt of information. The managing device 510 can employ a communication/monitoring component such as communication/monitoring component can 410 discussed supra, in or to facilitate relaying of communication. For example, in an aspect, a certain personnel can be assigned to monitor an area, either physically or remotely. According to this aspect, the monitoring component 410 can include a look up table that relates one or more remote sensing devices to an individual.

For example, Officer Sam could be assigned to monitor and respond to all active occurring on the fourth floor of the North building. Remote sensing devices 502 identified as numbers 35-65, can be located on the fourth floor of the North building. When the managing device 506 receives a signal from a remote sensing device, it can identify the particular device originating the signal and the individual who is assigned to the area covered by the device. In turn, the managing device 506 can forward the environmental data and/or context data to the other device 510 controlled by the assigned individual. According to this example, the managing device 506 can initiate a phone call or text message to Officer Sam's mobile phone. When Officer Sam picks up the phone he can receive the environmental information. For example, he can receive an audio description including the number and type of intruders at a specific location. In addition, the managing device 506 can enable real-time streaming of audible information gathered at the remote sensing device to Officer Sam's phone so that Officer Sam can listen to the activity occurring at a particular location.

Further, where a plurality of sensing devices 502 are employed, system 500 can enable communication between the devices. In an aspect sensing devices 502 can transmit environmental information to each other. The sensing devices (via an analysis component) can then employ triangulation schemes to further identify the exact location of an intruder. In another aspect, the managing device 506 and/or the other device 510 can receive data from multiple sensing devices and (via an analysis component) employ triangulation schemes to further identify the exact location of an intruder.

Figure 6:
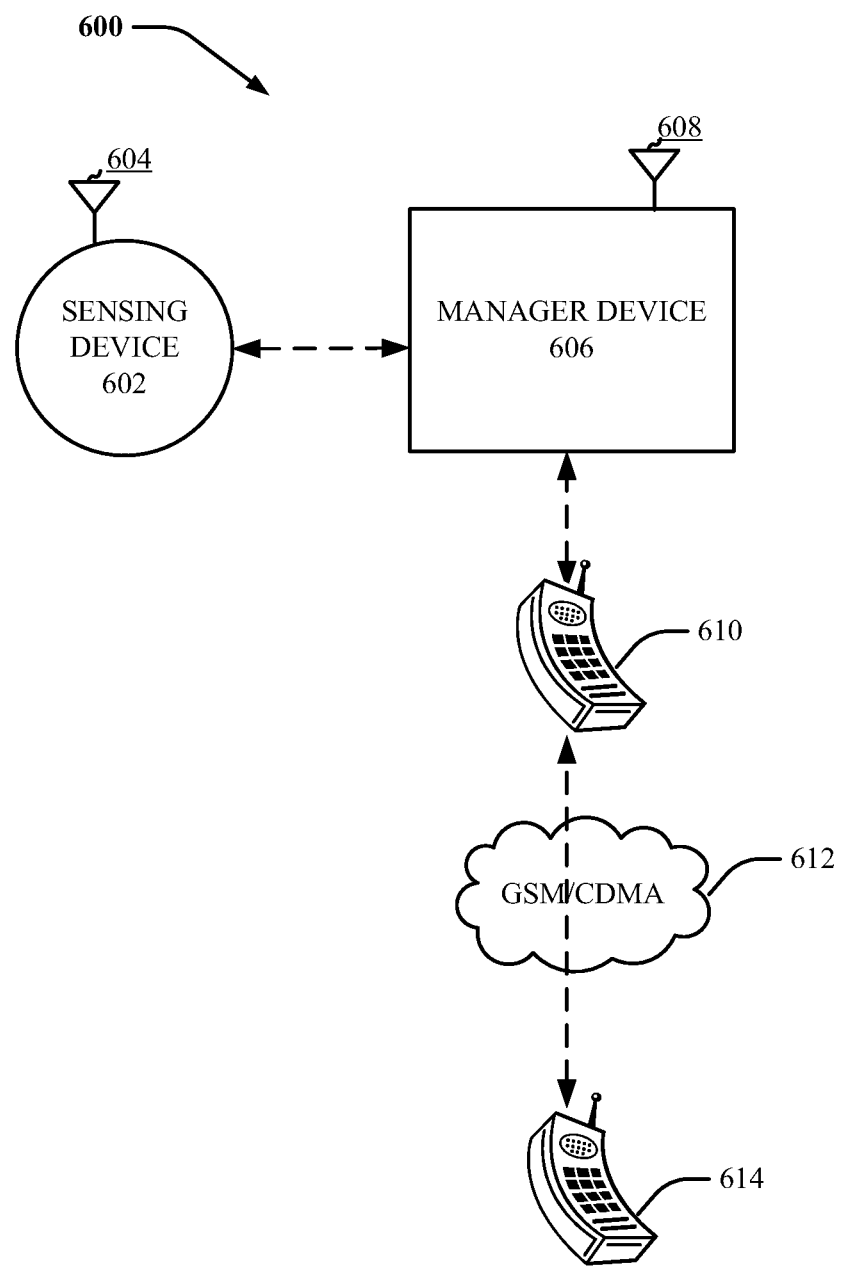
FIG. 6 presents a remote monitoring system in accordance with another embodiment.

Moving now to FIG. 6, depicted is a monitoring scheme/architecture 600 in accordance with the example above involving Officer Sam. In FIG. 6, remote a sensing device 602 is deployed at a location to be monitored. In an aspect, the location for the device 602 is input by voice description. Once an intruder is detected by the device 602 via a motion sensor, its location is first relayed to the manager device 606. The manager device 606 can activate a mobile phone 612 that is linked to the managing device 606 by Bluetooth™. This mobile phone 612 can dial a pre-set number to another phone 614 in a remote site over a GSM employing code division multiple access (CDMA). When the remote site phone 614 is picked up and connected the location of the remote sensing device can be played back to the user of the phone picked up 614. In this way, the location of the intruder is identified.

Figure 7:
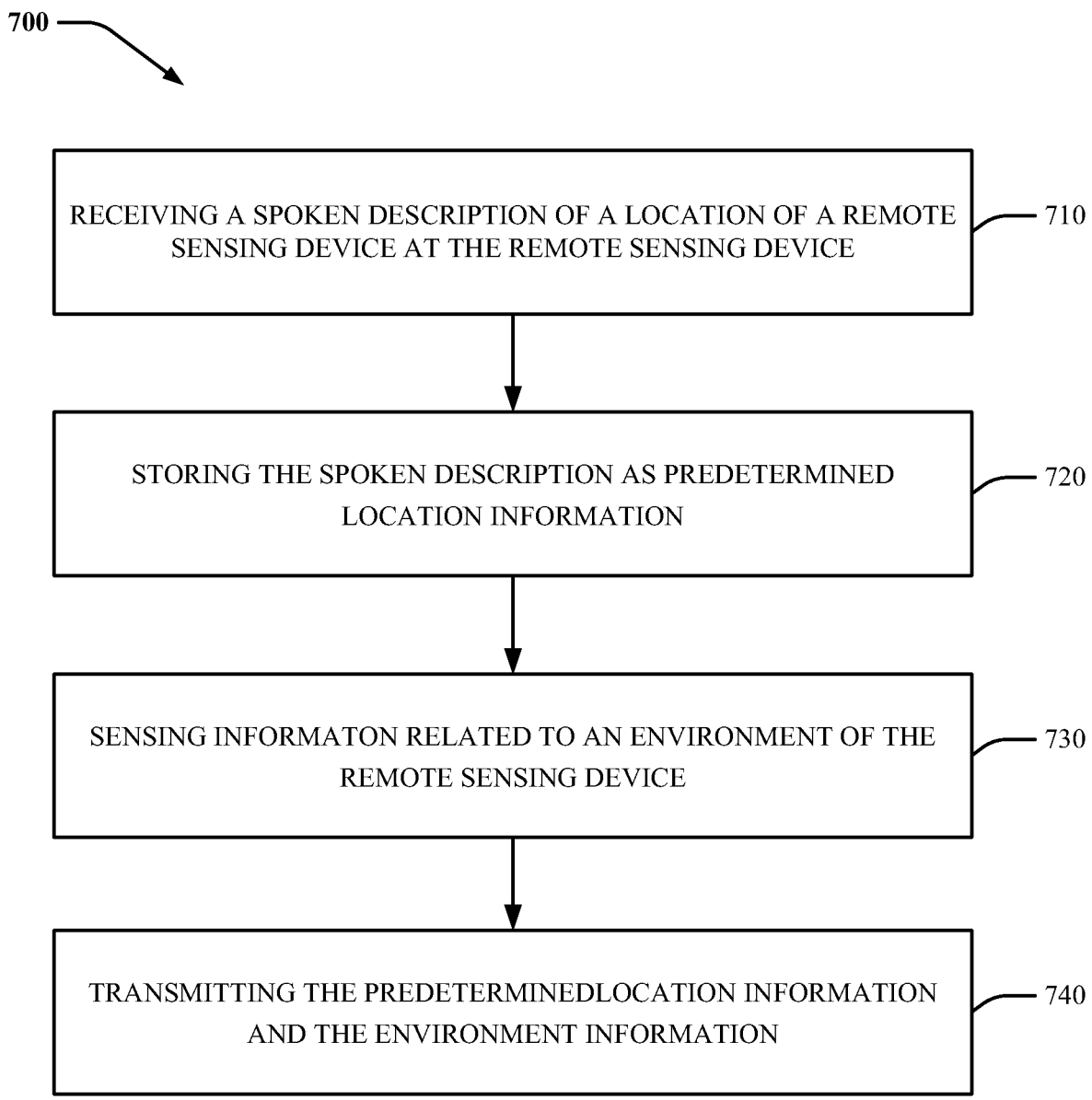
FIGS. 7-9 present various methodologies associated with remote monitoring in accordance with one or more embodiments.
Figure 8:
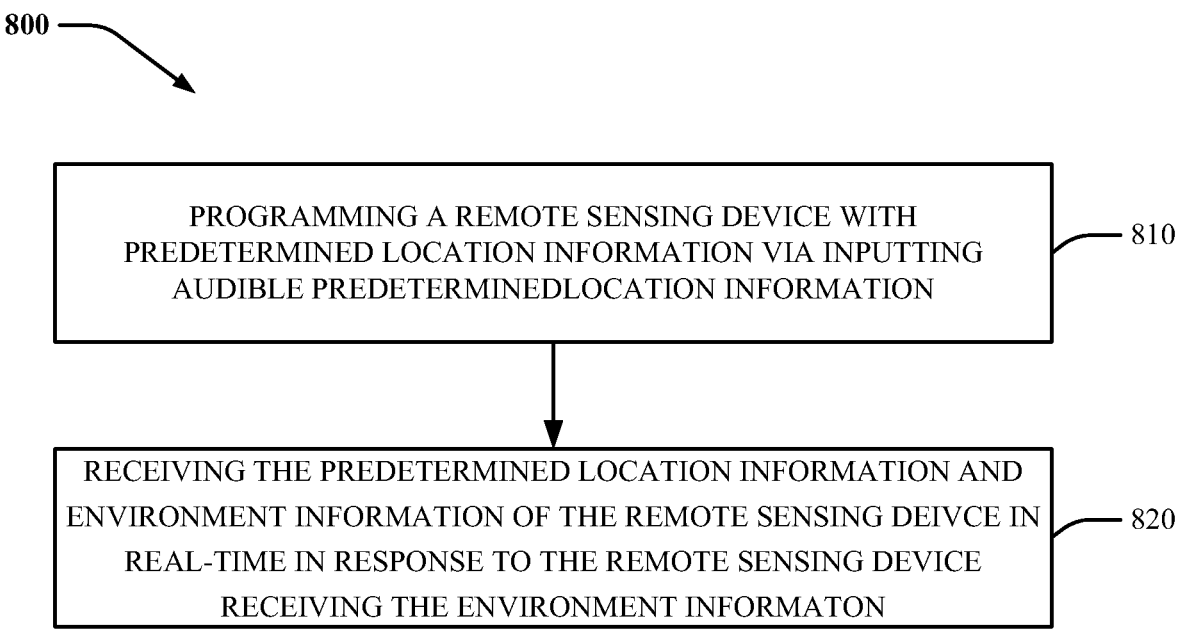
Figure 9:
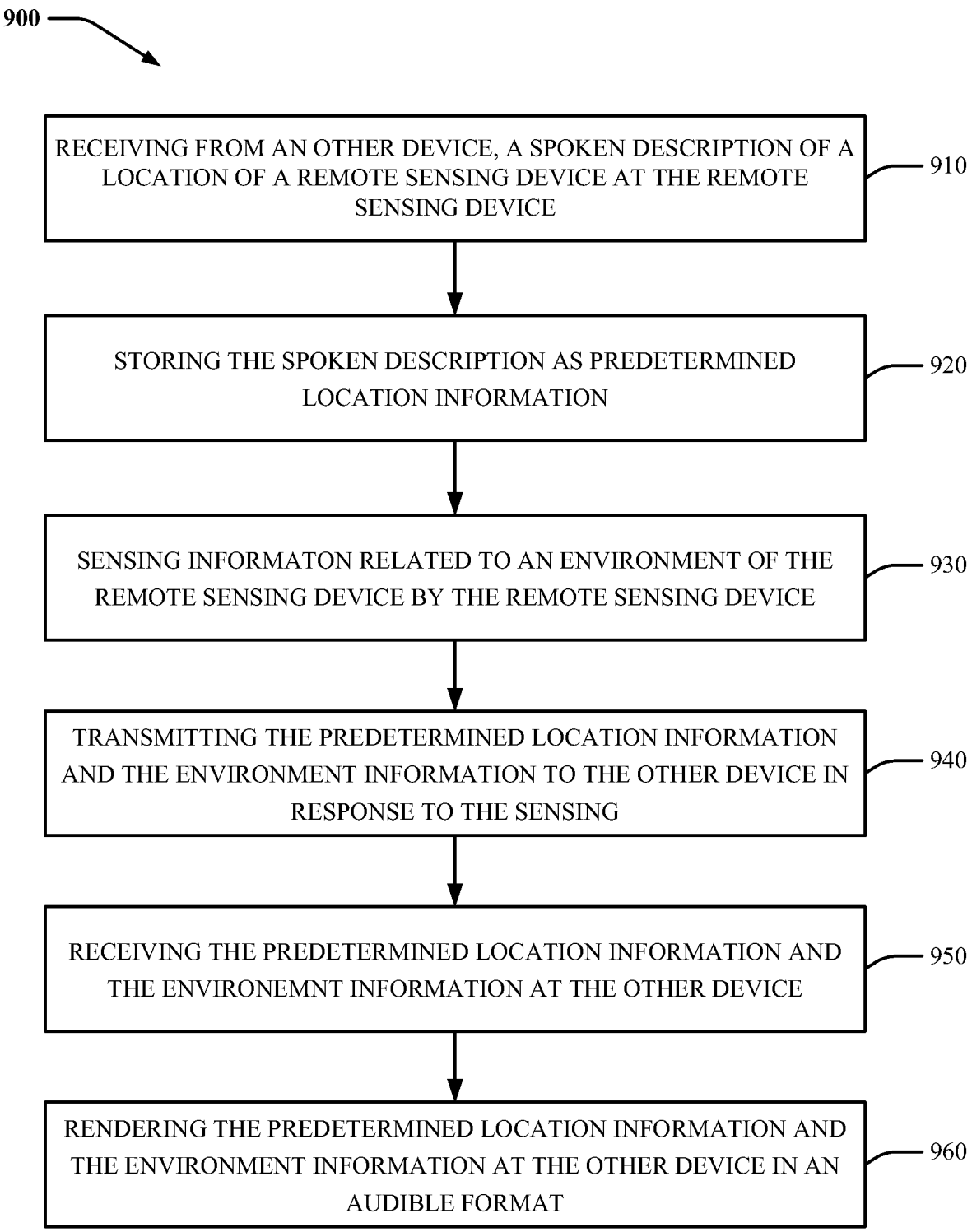

FIGS. 7-9 present various methodologies in accordance with one or more aspects of the subject disclosure. Turning to FIG. 7, presented is a process associated with capturing environment data by a remote sensing device. At 710, a spoken description of a location of a remote sensing device is received by the remote sensing device. At 720, the spoken description is stored by the remote sensing device as predetermined location information. At 730, the remote sensing device senses information related to an environment of the remote sensing device, and at 740, the remote sensing device transmits the predetermined location information and the environment information. FIG. 8 presents a process associated with monitoring and receiving environment data from a remote sensing device. At 810, a remote sensing device is programmed with predetermined location information via inputting audible location information. In an aspect, an individual can merely speak the location information to the device. In another aspect, a manager device can transmit predetermined location information to the remote sensing device over a wireless network. The predetermined location information can be stored in a format that allows for audible rending of the information. At 820, another device, such as the device performing the programming, can receive the predetermined location information and environment information of the remote sensing device in real-time when the remote sensing device receives the environment information.

FIG. 9 depicts a method of for remote monitoring of an area in accordance with aspect of systems 500 and 600. At 910, a remote sensing device receives a spoken description of a location of the remote sensing device from another device. At 920, the remote sensing device stores the spoken description as predetermined location information. At 930, the remote sensing device senses information related to its environment, such as whether an intruder is located within a vicinity of the remote sensing device. At 940, the remote sensing device transmits the predetermined location information and the environment information to the other device in response to the sensing. At 950, the other device receives the predetermined location information and the environment information. Lastly, at 960, the other device renders the predetermined location information and the environment information in an audible format.

Figure 10:
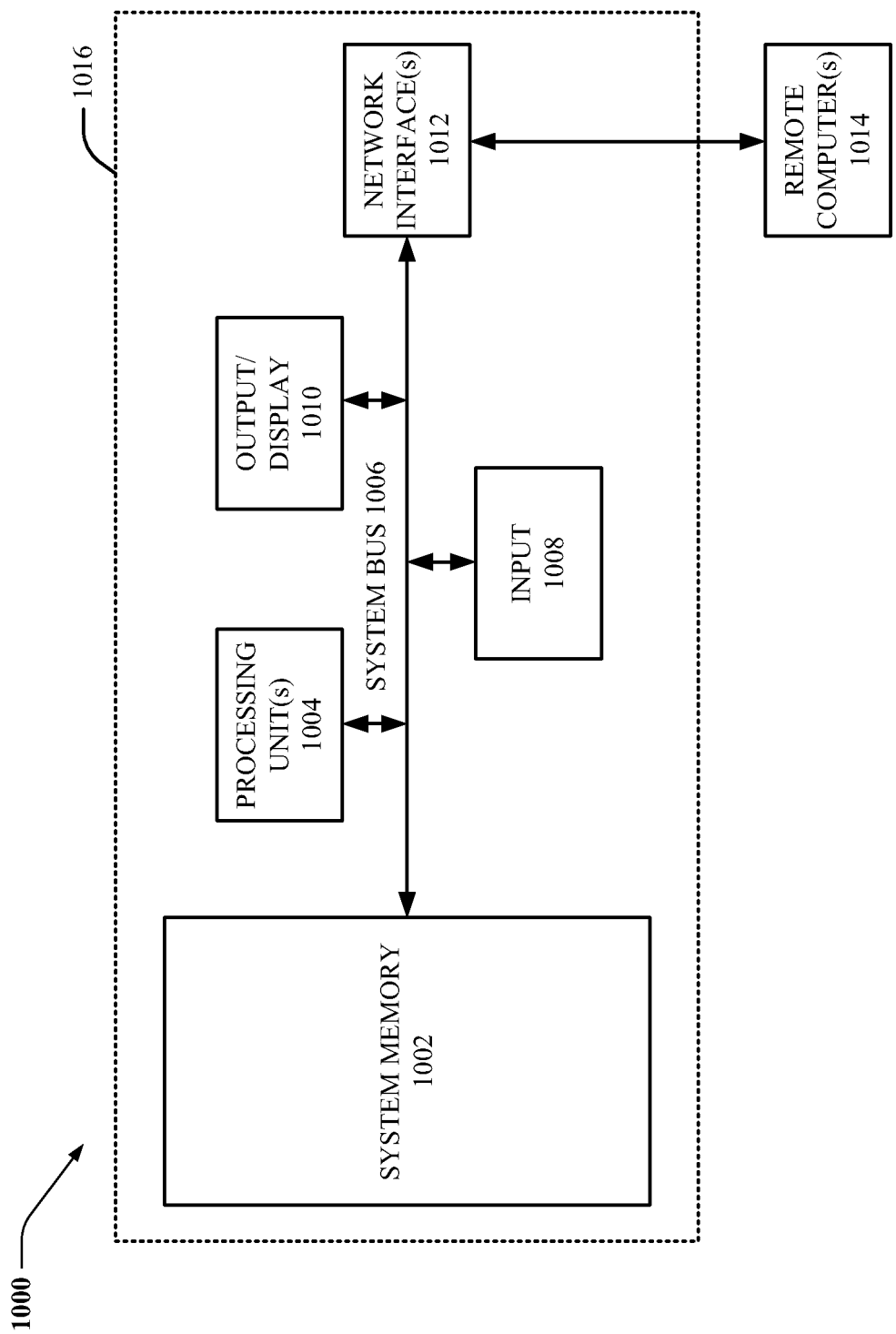
FIG. 10 illustrates a block diagram representing an exemplary non-limiting computing system or operating environment in which one or more aspects of various non-limiting embodiments described herein can be implemented.

FIG. 10 illustrates an example of a suitable computing system environment 1000 in which one or aspects of the non-limiting embodiments described herein can be implemented, although as made clear above, the computing system environment 1000 is only one example of a suitable computing environment and is not intended to suggest any limitation as to scope of use or functionality. Neither should the computing system environment 1000 be interpreted as having any dependency or requirement relating to any one or combination of components illustrated in the exemplary computing system environment 1000.

With reference to FIG. 10, an exemplary remote device for implementing one or more non-limiting embodiments includes a general purpose computing device in the form of a computer 1016. Components of computer 1016 may include, but are not limited to, a processing unit 1004, a system memory 1002, and a system bus 1006 that couples various system components including the system memory to the processing unit 1004.

Computer 1016 typically includes a variety of computer readable media and can be any available media that can be accessed by computer 1016. The system memory 1002 may include computer storage media in the form of volatile and/or nonvolatile memory such as read only memory (ROM) and/or random access memory (RAM). Computer readable media can also include, but is not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). By way of example, and not limitation, system memory 1002 may also include an operating system, application programs, other program modules, and program data.

A user can enter commands and information into the computer 1016 through input devices 1008. A monitor or other type of display device is also connected to the system bus 1006 via an interface, such as output interface 1012. In addition to a monitor, computers can also include other peripheral output devices such as speakers and a printer, which may be connected through output interface 1012.

The computer 1016 may operate in a networked or distributed environment using logical connections to one or more other remote computers, such as remote computer 1012. The remote computer 1012 may be a personal computer, a server, a router, a network PC, a peer device or other common network node, or any other remote media consumption or transmission device, and may include any or all of the elements described above relative to the computer 1016. The logical connections depicted in FIG. 10 include a network, such local area network (LAN) or a wide area network (WAN), but may also include other networks/buses. Such networking environments are commonplace in homes, offices, enterprise-wide computer networks, intranets and the Internet.

As mentioned above, while exemplary non-limiting embodiments have been described in connection with various computing devices and network architectures, the underlying concepts may be applied to any network system and any computing device or system.

Also, there are multiple ways to implement the same or similar functionality, e.g., an appropriate application programming interface (API), tool kit, driver source code, operating system, control, standalone or downloadable software object, etc. which enables applications and services to take advantage of techniques provided herein. Thus, non-limiting embodiments herein are contemplated from the standpoint of an API (or other software object), as well as from a software or hardware object that implements one or more aspects of the shared shopping techniques described herein. Thus, various non-limiting embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described infra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various non-limiting embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

As discussed herein, the various embodiments disclosed herein may involve a number of functions to be performed by a computer processor, such as a microprocessor. The microprocessor may be a specialized or dedicated microprocessor that is configured to perform particular tasks according to one or more embodiments, by executing machine-readable software code that defines the particular tasks embodied by one or more embodiments. The microprocessor may also be configured to operate and communicate with other devices such as direct memory access modules, memory storage devices, Internet-related hardware, and other devices that relate to the transmission of data in accordance with one or more embodiments. The software code may be configured using software formats such as Java, C++, XML (Extensible Mark-up Language) and other languages that may be used to define functions that relate to operations of devices required to carry out the functional operations related to one or more embodiments. The code may be written in different forms and styles, many of which are known to those skilled in the art. Different code formats, code configurations, styles and forms of software programs and other means of configuring code to define the operations of a microprocessor will not depart from the spirit and scope of the various embodiments.

Within the different types of devices, such as laptop or desktop computers, hand held devices with processors or processing logic, and also possibly computer servers or other devices that utilize one or more embodiments, there exist different types of memory devices for storing and retrieving information while performing functions according to the various embodiments. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to one or more embodiments when executed, or in response to execution, by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to one or more embodiments as described herein enable the physical transformation of these memory devices. Accordingly, one or more embodiments as described herein are directed to novel and useful systems and methods that, in the various embodiments, are able to transform the memory device into a different state when storing information. The various embodiments are not limited to any particular type of memory device, or any commonly used protocol for storing and retrieving information to and from these memory devices, respectively.

Embodiments of the systems and methods described herein facilitate the management of data input/output operations. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Although some specific embodiments have been described and illustrated as part of the disclosure of one or more embodiments herein, such embodiments are not to be limited to the specific forms or arrangements of parts so described and illustrated. The scope of the various embodiments are to be defined by the claims appended hereto and their equivalents.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. As used herein, unless explicitly or implicitly indicating otherwise, the term "set" is defined as a non-zero set. Thus, for instance, "a set of criteria" can include one criterion, or many criteria.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A sensing device, comprising:
    an acoustic sensor array;
    a processor; and
    a memory that stores location information identifying a location of the sensing device and stores executable instructions that, when executed by the processor, facilitate performance of operations, comprising:
        receiving location information identifying a location prior to positioning of the sensing device at the location;
        detecting, using the acoustic sensor array, noise at the location after the positioning of the sensing device at the location;
        determining, using acoustic scene analysis, a context of the sensing device based on the noise, wherein the context comprises a quantity of objects associated with the noise within the environment; and
        transmitting the location information and context information identifying the context of the sensing device to a remote device based on sensing of the noise via the acoustic sensor array.

2. The sensing device of claim 1, wherein transmitting the location information and context information to the remote device occurs in response to the context being determined.

3. The sensing device of claim 1, wherein the acoustic sensor array comprises at least two microphones positioned in disparate locations within the sensing device.

4. The sensing device of claim 1, wherein the operations further comprise:
    initiating a telephone call to the remote device, the telephone call comprising the location information and context information identifying the context of the sensing device.

5. The sensing device of claim 1, wherein the context is determined to comprise an indication of an intruder, and wherein the operations further comprise:
    transmitting information indicative of the intruder to the remote device.

6. The sensing device of claim 1, wherein the location information is received from a device external to the sensing device.

7. The sensing device of claim 1, wherein the acoustic sensor array comprises an acoustic vector sensor array.

8. The sensing device of claim 1, wherein the context information further comprises identification information representative of an identifier associated with the sensing device.

9. A method, comprising:
    receiving, by a sensing device comprising a processor and an acoustic sensor array, location information identifying a location prior to positioning of the sensing device at the location;
    detecting, by the sensing device using the acoustic sensor array, noise information at the location after the positioning of the sensing device at the location;
    determining, by the sensing device using acoustic scene analysis, context information representative of a context of the sensing device, wherein the context information comprises object information representative of at least a number of objects creating the noise located within the environment, and
    transmitting, by the sensing device, location information representative of a location of the sensing device and the context information to indicate the context of the sensing device to a remote device.

10. The method of claim 9, further comprising:
    recording, by the sensing device, the noise information.

11. The method of claim 10, further comprising:
    transmitting, by the sensing device, the noise information to an external storage device.

12. The method of claim 9, wherein the location of the sensing device is a first location, and further comprising:
    determining, by the sensing device, a second location of the object.

13. The method of claim 12, wherein the determining the second location comprises determining the second location with a triangulation scheme, and wherein the triangulation scheme uses the noise information and other device information received from a second sensing device and from a third sensing device.

14. The method of claim 9, wherein the transmitting of the location information comprises initiating a telephone call to the remote device, the telephone call comprising the location and context of the sensing device.

15. The method of claim 9, wherein the location information is received from a device external to the sensing device.

16. The method of claim 9, further comprising:

transmitting, by the sensing device to the remote device, identification information representative of an identifier associated with the sensing device.

17. A non-transitory machine-readable medium, comprising executable instructions that, when executed by a processor, facilitate performance of operations, comprising:

receiving location information identifying a location prior to positioning of a sensing device at the location;

analyzing scene information representing a scene to determine a context of the sensing device based on noise information obtained that is representative of a noise sensed by an acoustic sensor at the location after the positioning of the sensing device at the location, wherein the context comprises a quantity of objects associated with the noise information; and transmitting location information indicating a location of the sensing device and context information indicating the context of the sensing device to a remote device.

18. The non-transitory machine-readable medium of claim 17, further comprising:

digitizing, by employing an analog to digital converter of the sensing device, a signal associated with the noise.

19. The non-transitory machine-readable medium of claim 17, wherein the context is determined to comprise an intruder context indicative that an intruder is threshold likely to be present, and wherein the operations further comprise:

transmitting information representative of the intruder context to the remote device.

20. The non-transitory machine-readable medium of claim 17, wherein the acoustic sensor comprises at least two microphones positioned in distinct locations within the sensing device.

* * * * *